United States Patent
Hantusch et al.

(10) Patent No.: US 12,128,496 B2
(45) Date of Patent: Oct. 29, 2024

(54) METHOD FOR SEALING A CASTING MOULD FOR ALUMINOTHERMIC RAIL WELDINGS

(71) Applicant: GOLDSCHMIDT HOLDING GMBH, Leipzig (DE)

(72) Inventors: Jan Hantusch, Markkleeberg (DE); Werner Angenendt, Wuppertal (DE); Sophia Heinig, Leipzig (DE); Thomas Reinicke, Salzatal/OT Lieskau (DE); Daniel Meckl, Teutschental/OT Zscherben (DE)

(73) Assignee: GOLDSCHMIDT HOLDING GmbH, Leipzig (DE)

( * ) Notice: Subject to any disclaimer, the term of this patent is extended or adjusted under 35 U.S.C. 154(b) by 911 days.

(21) Appl. No.: 17/268,232

(22) PCT Filed: Jul. 31, 2019

(86) PCT No.: PCT/EP2019/000233
§ 371 (c)(1),
(2) Date: Feb. 12, 2021

(87) PCT Pub. No.: WO2020/035164
PCT Pub. Date: Feb. 20, 2020

(65) Prior Publication Data
US 2021/0299780 A1  Sep. 30, 2021

(30) Foreign Application Priority Data
Aug. 15, 2018  (DE) .................... 10 2018 006 415.9

(51) Int. Cl.
*B23K 23/00* (2006.01)
*B22C 9/22* (2006.01)
(Continued)

(52) U.S. Cl.
CPC ................ *B23K 23/00* (2013.01); *B22C 9/22* (2013.01); *B22D 19/04* (2013.01); *B23K 2101/26* (2018.08); *B23K 2103/04* (2018.08)

(58) Field of Classification Search
CPC ................ B23K 23/00; B23K 2101/26; B23K 2101/06; B23K 2103/04; B22C 9/22; B22D 19/04; E01B 11/44; E01B 11/54
See application file for complete search history.

(56) References Cited

U.S. PATENT DOCUMENTS

| 5,078,200 A | 1/1992 | Guntermann et al. |
| 9,764,377 B2 | 9/2017 | Wolff et al. |
| 2011/0001076 A1* | 1/2011 | Sidler ................... F16K 3/0263 251/248 |

FOREIGN PATENT DOCUMENTS

| AU | 9707298 A | 7/1999 |
| CH | 658817 A5 | 12/1986 |

(Continued)

OTHER PUBLICATIONS

International Search Report and Written Opinion mailed Oct. 30, 2019 issued in Application No. PCT/EP2019/000233.

*Primary Examiner* — Dana Ross
*Assistant Examiner* — Kuangyue Chen
(74) *Attorney, Agent, or Firm* — Oliff PLC (57) ABSTRACT

A casting mold (6) consists of two mold halves (4, 5), which are intended for setting up on both sides of the welding groove (3) between two rail ends (1, 2) to be connected, thereby forming a casting space (8) representing a cross-sectional profile of the rails. For sealing the casting space (8) between the rail bodies on both sides of the welding groove (3) and the wall portions (9, 10) of the casting mold (6) that are facing this welding groove, inserted in gaps (11, 12) are strips consisting of a compound at least containing expandable graphite, which as a result of heat being supplied during (Continued)

a preheating process expands and forms a reliable seal. In comparison with using filler sand at this point, there is the advantage that a much smaller quantity of compound has to be carried along when working on the laid track.

20 Claims, 7 Drawing Sheets

(51) Int. Cl.
  *B22D 19/04* (2006.01)
  *B23K 101/26* (2006.01)
  *B23K 103/04* (2006.01)

(56) References Cited

FOREIGN PATENT DOCUMENTS

| | | |
|---|---|---|
| EP | 0444480 A1 | 9/1991 |
| EP | 0925866 A2 | 6/1999 |
| FR | 2323488 A1 * | 4/1977 |
| WO | 2014/106646 A1 | 7/2014 |

\* cited by examiner

METHOD FOR SEALING A CASTING MOULD FOR ALUMINOTHERMIC RAIL WELDINGS

The invention relates to a method according to some embodiments.

An aluminothermic welded connection consists of an intermediate casting structure that fills a welding groove between the front sides of the rail ends to be connected, and arises as a reaction product of the aluminothermic, fine-grained mixture of iron oxide and aluminum, which can have added to it specific alloying elements for influencing the hardness along with additional reactants for attenuating the reaction.

Welding of the rail ends is routinely performed with preheating, so as to create homogeneous surface temperatures of the inner walls of the casting space and expel any moisture that might be present. While the surface temperatures influence the cooling rate of the molten steel, and hence the casting time and casting rate, temperature deviations inevitably arise as a function of the varying heat conductivities of the inner walls of the casting mold as well as the front sides of the rail ends.

For example, such a casting mold is known from EP 0 925 866 B1, and consists of two mold halves, which are set up on both sides of the rail connection to be manufactured, and here symmetrically cover the welding groove. The welding groove together with the front sides of the rail ends to be connected and the inner walls of the mold halves forms a casting space, which in its core area replicates the rail profile, and into which is poured the reaction product of the aluminothermic reaction, specifically molten steel.

The two mold halves form interfaces not just in a dividing plane of the casting mold, but also on the surfaces of the rail ends to be aluminothermically welded, which thus have slits between them that need to be sealed to prevent an uncontrolled exit of molten steel. This seal must be constituted in such a way as to be resistant to the temperatures of the steel melt during a pouring process.

Known for sealing the mentioned slit is to use a so-called filler sand, which when working on the laid track must be carried along in the form of bags that can each hold 25 kg. This filler sand must be manually applied from outside of the casting mold at each welding point, and in doing so seal the slit, which is associated with a rather significant time expenditure. This type of seal is also not free of interactions with the steel melt, since weld penetrations by the sand can arise at locations where the filler sand comes into contact with the melt, which can be difficult to eliminate after the fact by grinding. The filler sand further routinely contains moisture, so that vapor bubbles can arise under the influence of heat, which can lead to welding defects like "wormholes".

Known from CH 658 817 A5 is a method and a device for aluminothermic welding, in which a casting mold consists of two mold halves, whose contact surfaces are provided with sealants, wherein the mold halves are tightly sealed with a pressing device, which is firmly tightened.

The problem of sealing the casting space is encountered not just in welded rail connections, but also in railhead repair and surface-layer welding, and other welding processes that are aluminothermically performed.

Known from WO 2014/106646 A1 is a method for manufacturing a core and/or molding sand for foundry purposes, wherein a mineral molding base with a binding agent comprised of water glass and exfoliated graphite is used. This binding agent mixture is intended to facilitate core removal while at the same time improving the surface quality of the manufactured casting body.

As a consequence, this known technique for manufacturing a seal for the casting mold is technically not to be regarded as optimal, is time and labor-intensive, and also cumbersome in terms of practical handling when working on the laid track, since massive additives have to be carried along. The working result achievable in the process further depends on the experience and care of the respective welder.

The object of the invention is to configure a casting mold for aluminothermic welding processes of the kind described at the outset with an eye toward more easily manufacturing a seal for the casting space. This object is achieved for such a casting mold by the features in the some embodiments described herein.

According to the above, it is essential to the invention that a mineral or carbonaceous, fireproof sealing compound that can be expanded via thermal or chemical initiation be used instead of the previously used filler sand. This is based on the idea of positioning this compound in a slit, which on the one side is bordered by surfaces of the rail body or whatever two workpieces are to be welded, and on the other side by wall sections of the mold halves. Through exposure to thermally or chemically initiated expansion, the sealing compound will fill out the slit, become pressurized in the latter, and in this way form a closure that reliably seals the slit. In a thermally initiated expansion, an embedded or chemically bound liquid is evaporated by supplying heat, wherein the accompanying increase in volume leads to an expansion of the compound. For example, use can in this conjunction be made of hydrates, carbonates, or nitrates, which release hydrogen, carbon dioxide or nitrogen. In a chemically initiated expansion, a chemical reaction leads to the release of a gas or a vapor, which triggers an expansion of the compound. Since the sealing compound is thus expandable, the advantage becomes that significantly less compound must be carried along while working on the laid track by comparison to the use of filler sand known for this purpose. Because these sealing compounds develop their actual sealing effect as the result of expansion once properly applied, the care required with establishing a seal for the casting mold diminishes, as does the time and labor associated herewith. Once the process of applying the sealing compound has been simplified, there is a lesser dependence on the care and experience of the welder performing these operations. Another advantage lies in the fact that there is no longer the risk that moisture will be introduced into the casting space of the casting mold, which could otherwise not be ruled out during the use of filler sand.

Similarly to the application of the filler sand previously known for this purpose, an expandable compound intended for sealing can also be used on the outside of the casting mold, i.e., next to an actual welding bead, without contacting the latter. In this case as well, a slit between the rail body and the surfaces of the casting mold facing them is tightly closed. The advantages associated with using such a compound as a sealing compound are also present in this case.

The applications for a casting mold equipped according to the invention relate to rail connection welding or repair welding. As a rule, the latter relates to a repair of wear and tear on the railhead, in particular track faults such as squats, belgrospis, indentations, outbreaks and skid marks. During such repair welding operations, the defective part of the railhead is first removed, after which the resultant recess is filled via surface-layer welding. The objective here is that there be a steady progression of the essential properties of the rail body over the entire welding point. Apart from rail connection welding, the invention can also be used for welding other workpieces, wherever aluminothermic welding comes into use.

Used as the expandable sealing compound is an intumescent substance or a substance that at least contains intumescent portions. For example, this intumescent substance can be exfoliated graphite. Expanding exfoliated graphite by increasing the temperature is known, but has heretofore only been used for flame protection, specifically for preventing flame propagation, in metallurgy as oxidation protection, and in the chemical industry in conjunction with lacquers and paints. Exfoliated graphite satisfies all requirements to be placed on a sealing compound, which have to be satisfied by a casting mold for aluminothermic welding processes. In this connection, another possible mineral compound is vermiculate, a mineral, in particular siliceous material, which releases water vapor when heat is supplied, resulting in an expansion.

In this conjunction, exfoliated graphite can be used by itself or in combination with other mineral substances.

The features in some embodiments are geared toward an alternative kind of use for the expandable sealing compound. The latter can be used directly in gaps of the mold halves, and be made available in this state at the welding location. This means that the mold halves and sealing compound can be brought to their job site as one piece. However, the sealing compound can also be introduced into the gaps of the mold halves only at the respective job site. This means that the mold halves and sealing compound are brought to their job site separately from each other.

According to the features in some embodiments, the sealing compound, e.g., exfoliated graphite, is used as a molding body, wherein production in an extrusion process is possible.

According to the features in some embodiments, the sealing compound is used in the form of a strip, in particular a self-adhesive strip. This offers the advantage of a flexible assembly on contours of the mold halves or rail body. If appropriate structural precautions are taken for the mold halves, for example in the form of gaps, it is possible to positively fix the strip in these gaps.

According to the features in some embodiments, the sealing compound is used in the form of a pasty substance, which is applied in the form of a caterpillar at its job site through spraying, or is injected into a gap of the respective mold half. In this case, the sealing compound can be brought to the job site in a cartridge.

The features in some embodiments are geared toward another variant for the use of exfoliated graphite. The latter is here used in the form of a free-flowing granulate, which in this form is mixed in with other mineral fireproof substances, so as to modify their properties. A mixture of substances put together in this way can then be used as an expandable sealing compound.

The features in some embodiments are geared toward different variants for initiating the expansion process of the expandable sealing compound. This process can be initiated using compounds that are exothermally reactive, so that such a reaction can be triggered by means of an ignition stick, thereby setting the expansion process in motion. However, the expansion can also be triggered directly by preheating the casting mold. In any event, this case involves bringing enough heat into the sealing compound, so that even other techniques familiar to the expert are also possible.

The features in some embodiments are geared toward a shape of the casting mold adjusted to the expansion process of the sealing compound. The focus is here on preventing this compound received in a gap from expanding in the direction toward the casting space. At the same time, a pressure sufficient for developing a reliable sealing effect in a slit between the rail body and the wall sections of the casting mold lying opposite the latter must be developed in the gap worked into a wall section of the casting mold, induced by the expansion process. For example, this can be achieved by various inner and outer slit widths, so that different outflow resistances are generated accordingly for the expanding sealing compound, and an outflow toward the interior side is in any event at least greatly impeded.

The features in some embodiments are geared toward a special kind of use for the expandable sealing compound. The latter here develops a sealing effect accompanied by direct contact with a welding bead.

As evident, the method according to the invention makes it possible to provide a seal easily and quickly for the casting space of a casting mold to be used in an aluminothermic process, specifically with less of an effort than in a method introduced at the outset to be allocated to prior art, and in a reproducible manner regardless of the experience and care of the respective welder.

The invention will be described in more detail below with reference to the attached drawings. Shown on.

Figure 1:
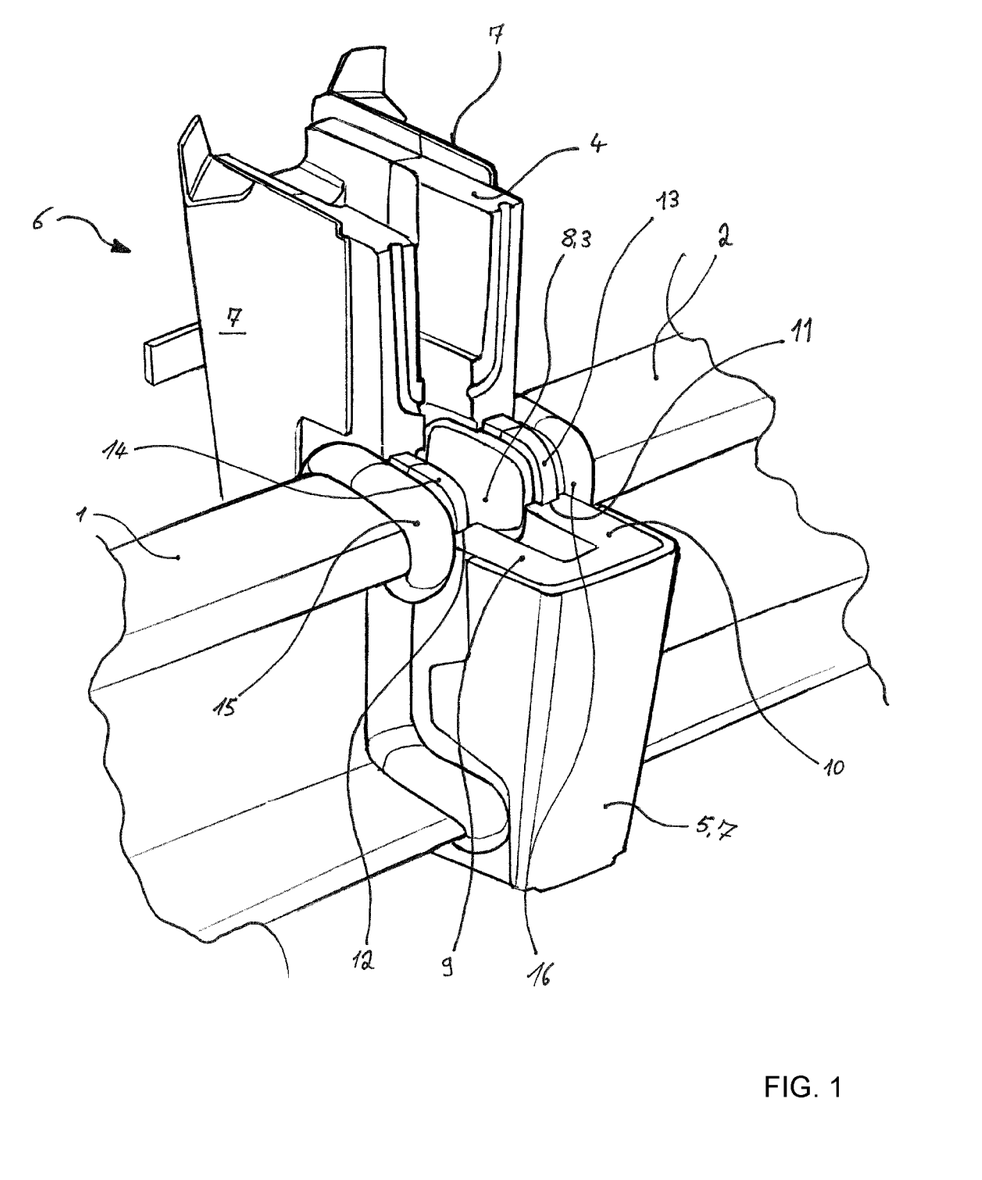
FIG. 1 is a perspective view of a casting mold according to the invention in a partial section.

FIG. 1 shows rail ends 1, 2 to be welded by way of an aluminothermic method, with a welding groove 3 present between their facing front sides. Marked 4, 5 are two mutually identical mold halves of a casting mold 6, which consist of the usual fireproof material, and on the outside are partially framed in a metallic sheath 7, a retaining plate.

In the assembled state of the casting mold 6, the mold halves 4, 5, of which the latter has only been shown incompletely, lie against each other in a vertical dividing plane and surround the welding groove 3 on both sides as viewed in the longitudinal direction of the rail ends 1, 2, thereby forming a casting space 8 that is bordered by the front sides of the rail ends 1, 2, and otherwise from the side and below by wall sections of the mold halves 4, 5.

The two mold halves 4, 5 are fixed to each other with means not graphically depicted in order to perform a welding operation. The aluminothermic reaction takes place in a crucible placed on the casting mold 6 (likewise not graphically depicted), ultimately yielding molten steel as the reaction product, which is introduced into the upwardly open casting mold.

The wall sections 9, 10 of both mold halves 4, 5 abutting the rail ends 1, 2 have gaps 11, 12, in which is placed a respective strip 13, 14 consisting of a thermally expandable substance, e.g., exfoliated graphite. FIG. 1 shows the respective strip 13, 14 after a completed expansion, which takes place from the outside, i.e., starting from the casting space 8. In order to reliably ensure these circumstances, gaps between the wall sections 9, 10 and the rail ends 1, 2 are designed smaller on the interior sides, i.e., the sides facing the casting space 8, than those on the exterior sides, thereby resulting in a significantly higher flow resistance toward the interior side by comparison to the exterior side. The expansion of the strips 13, 14 leads to the formation of beads 15, 16 on the exterior sides of the wall sections 9, 10, wherein a compression and a development of a reliable sealing effect by this substance comes about in the space between the rail ends 1, 2 and the gaps 11, 12 owing to the expansion, facilitated by a throttling effect as the expandable substance flows.

Functional elements on FIGS. 2 to 5 that correspond with those on FIG. 1 are correspondingly numbered, thus eliminating any need for a repeated description in this regard.

Figure 2:
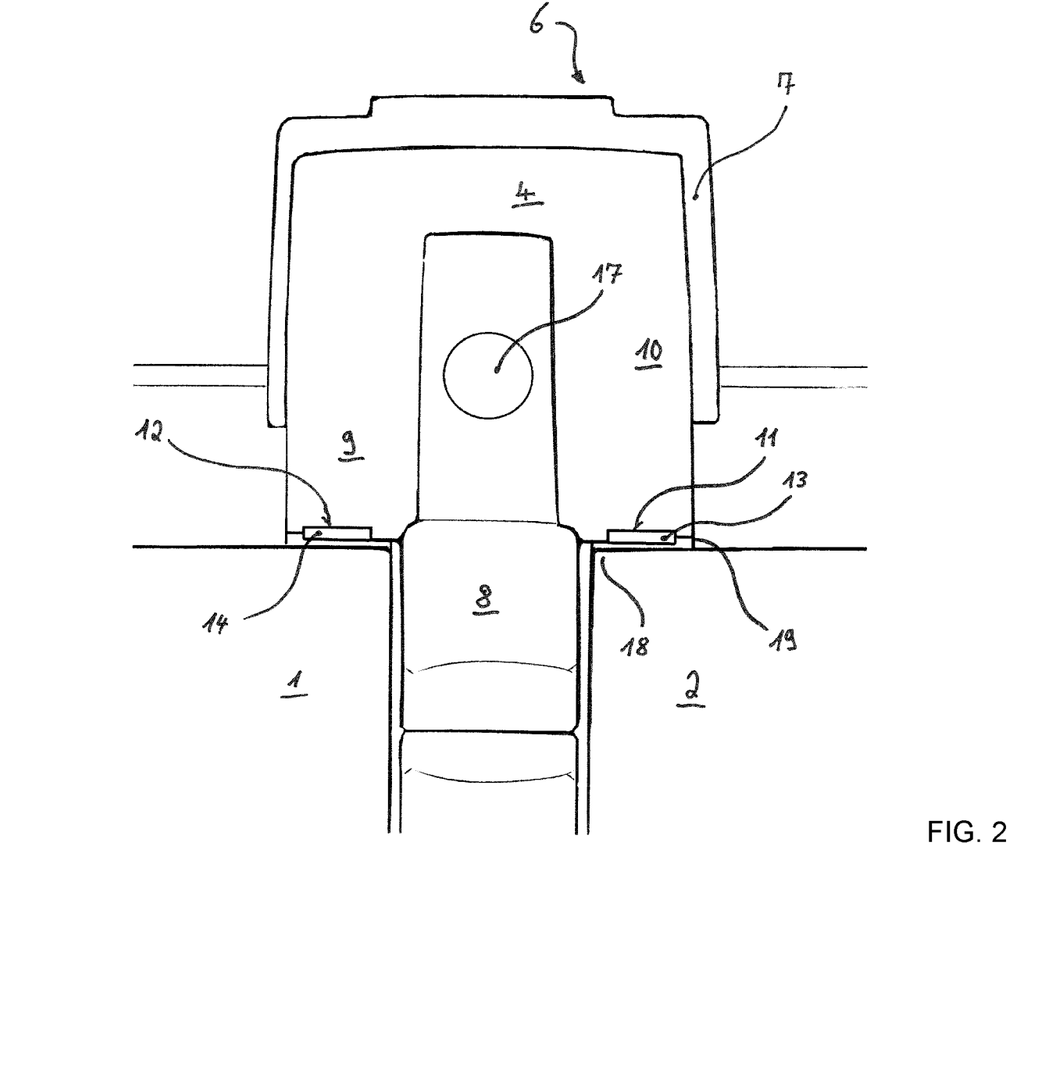
FIG. 2 is a flat, sectional view of a casting mold half according to FIG. 1 in the initial state.

FIG. 2 shows the casting mold 6 in a state shortly before pouring molten steel, wherein 17 denotes the confluence of a side riser (not otherwise graphically depicted). As evident, the slit widths 18 between the wall sections 9, 10 and the rail ends 1, 2 have distinctly smaller dimensions toward the interior side, specifically on the side facing the casting space 8, than the slit widths 19 on the respective exterior side. In this way, a clearly preferred direction of expansion is structurally prescribed for the strips 13, 14. FIG. 2 shows the strips 13, 14 in an as yet unexpanded state.

Figure 3:
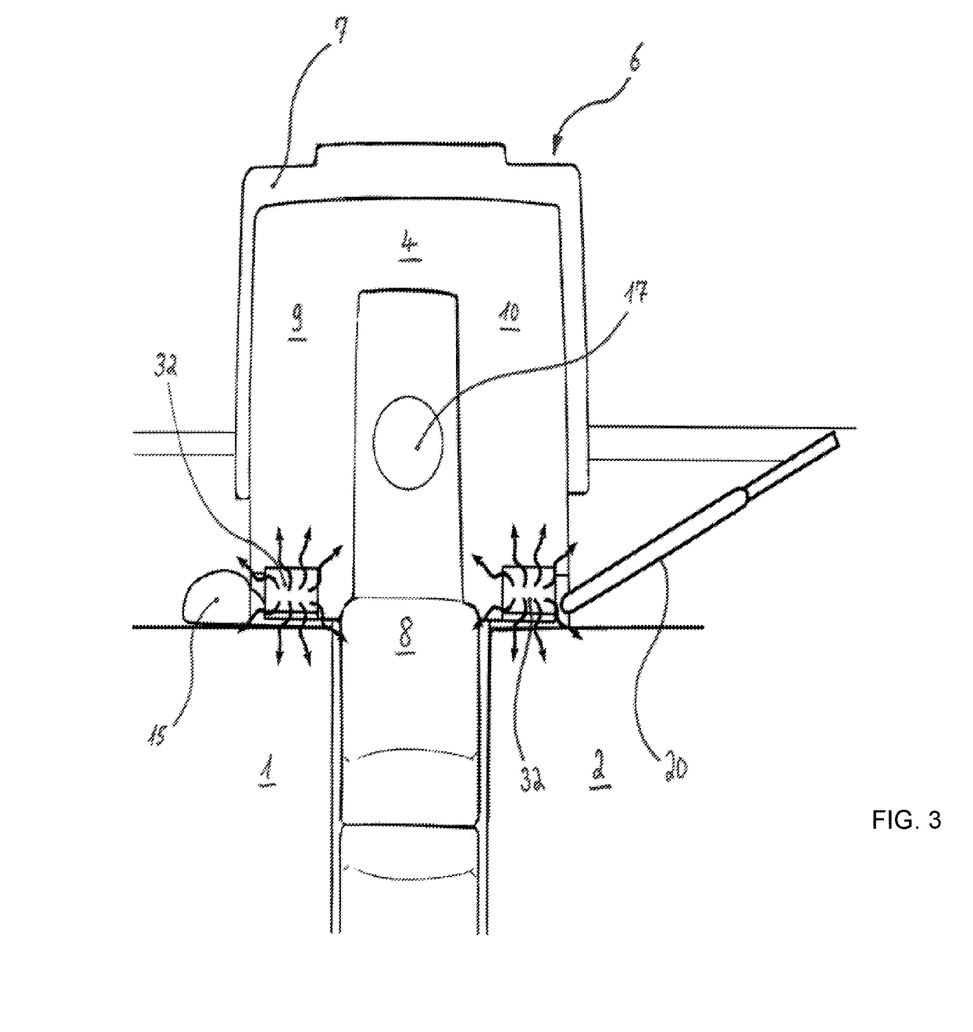
FIG. 3 is a flat, sectional view of a casting mold half according to FIG. 2 at the time an exfoliated graphite expansion begins.

FIG. 3 shows the casting mold 6 in a state where the expansion of the strips 13, 14 was manually initiated by means of a pyrotechnic substance 32 or an exothermally reactive substance with an ignition stick 20. The beads 15, 16 are formed and a seal is established above the slit widths 18, 19. Once this process has ended, the steel melt can be poured.

Figure 4:
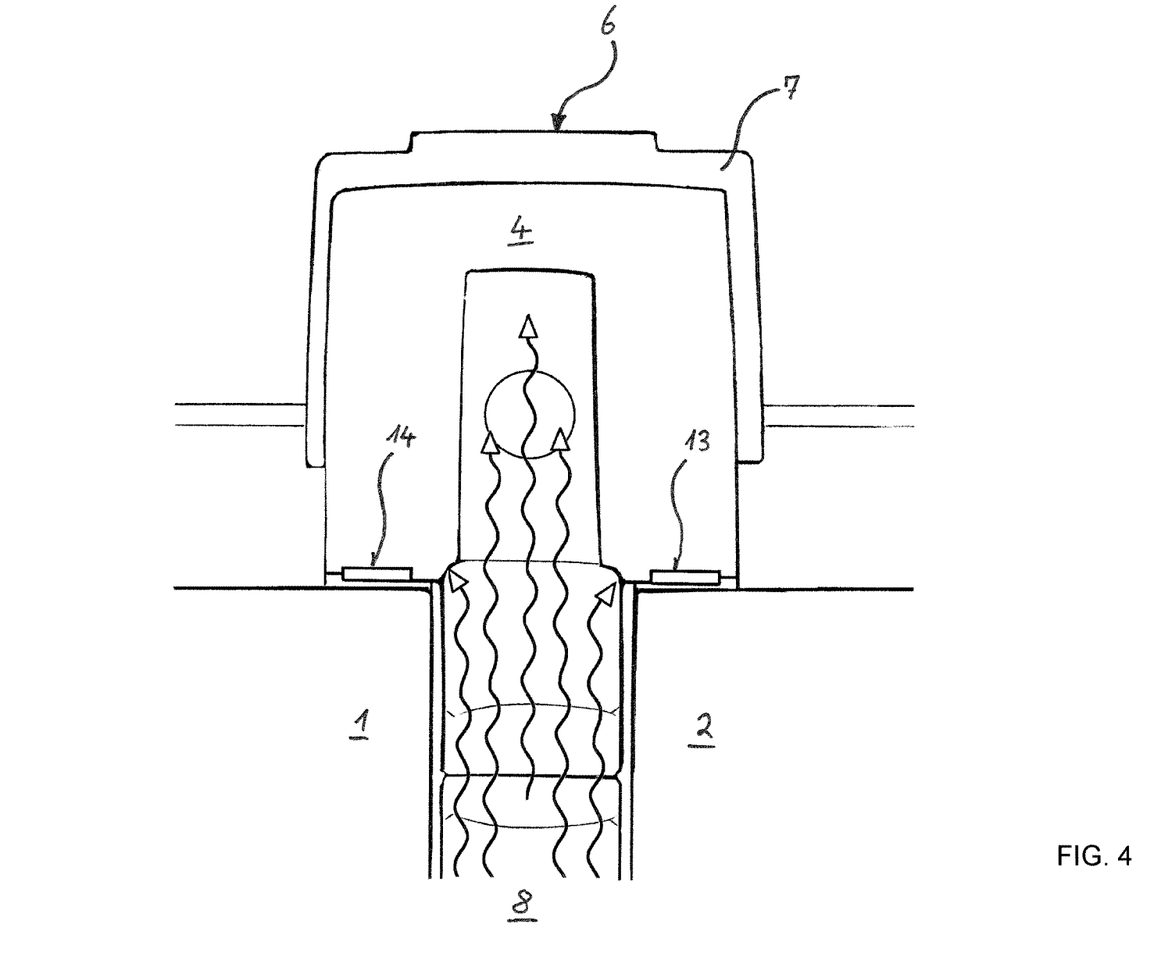
FIG. 4 is a flat, sectional view of a casting mold half according to FIG. 2 at the time an exfoliated graphite expansion begins while initiating the swelling process via preheating.

FIG. 4 shows the casting mold 6 in a state where the expansion of the strips 13, 14 starts out along a straight line. It is thermally initiated by preheating the casting space 8, which is done in a conventional manner, wherein the heat introduced in the process acts on the strips from the interior side of the casting space 8.

Figure 5:
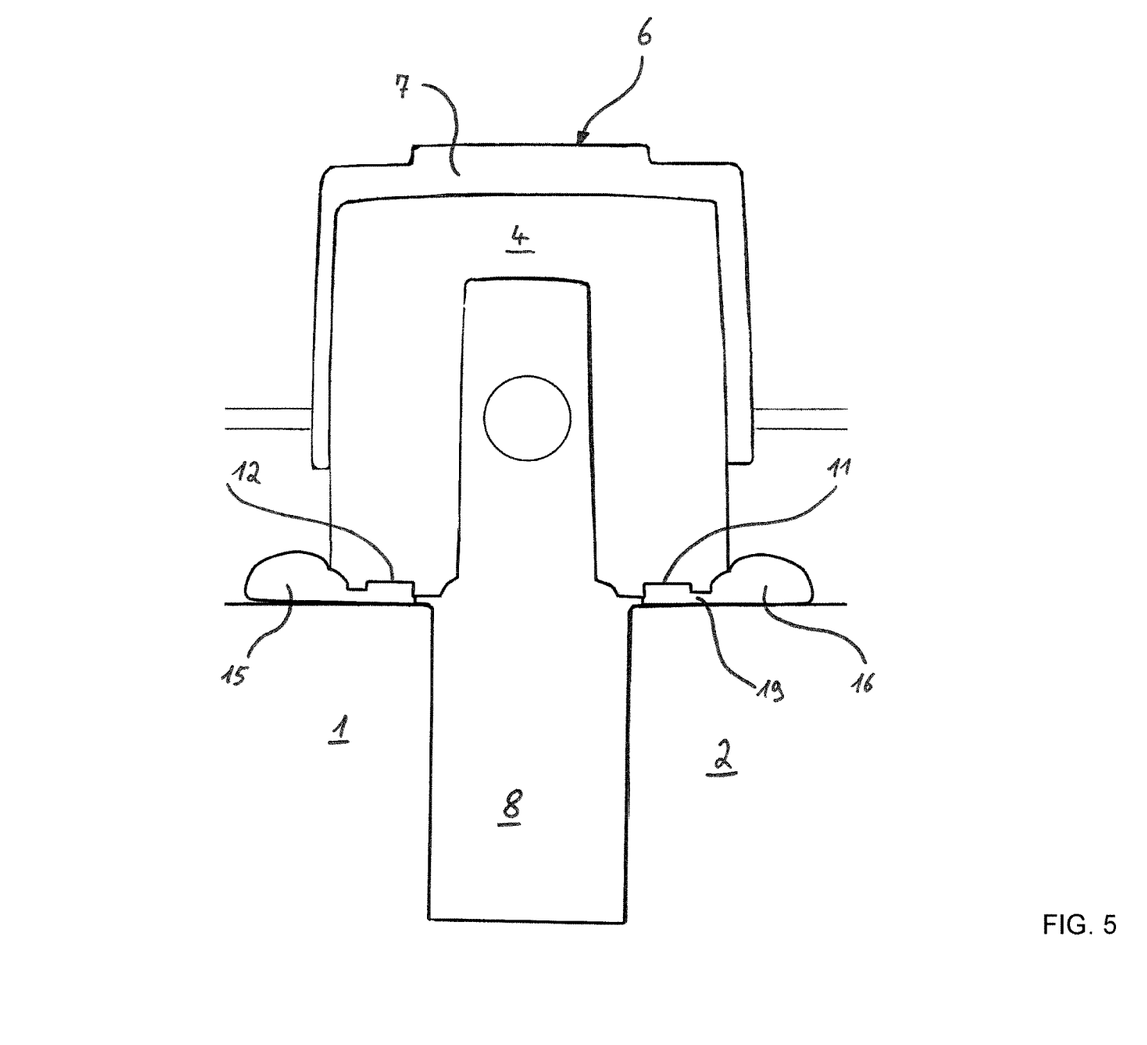
FIG. 5 is a flat, sectional view of a casting mold half according to FIG. 2 at the time an exfoliated graphite expansion has concluded.

FIG. 5 shows the casting mold in a state where the expansion of the strips 13, 14 has concluded, so that beads 15, 16 have formed on the exterior sides of the casting mold 6, and a sufficient sealing profile has come about in the area of the slit widths 18, 19.

Figure 6:
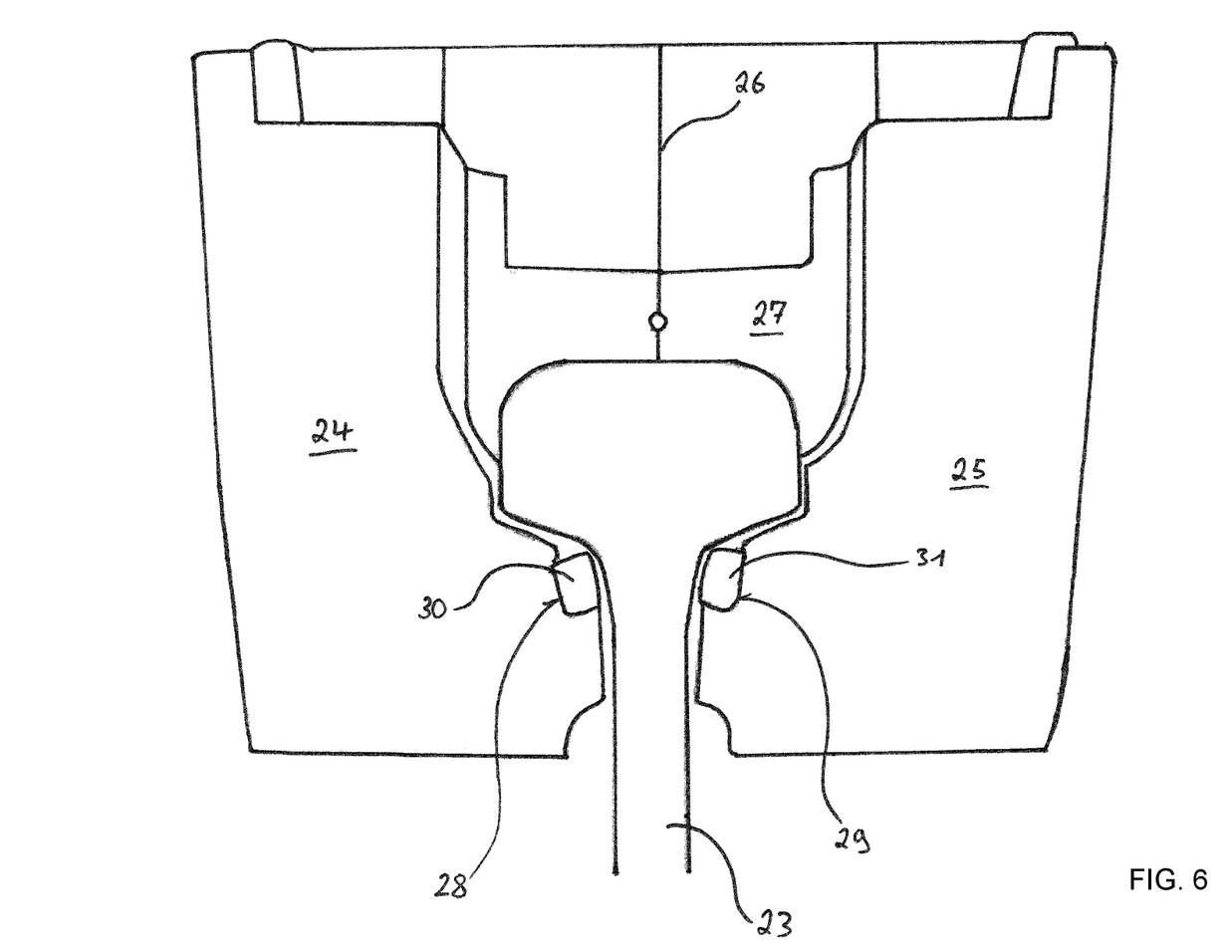
FIG. 6 is a flat, sectional view of a casting mold prepared for surface-layer welding in the railhead area.

FIG. 6 shows a casting mold 21 that is set up for repair surface-layer welding on the railhead 22 of a rail profile 23. The casting mold 21 once again consists of two mold halves 24, 25, which are fixed on either side of the rail profile 23 in a manner not graphically depicted, for example by means of a retaining plate, and lie tightly against each other along a vertical dividing plane 26, thereby yielding an upwardly open casting space 27.

The dividing plane 26 runs in a vertical central plane of the rail profile 23, wherein both mold halves 24, 25 engage underneath the railhead 22. 28, 29 denote gaps in the mold halves, which extend underneath the railhead 22 parallel to a longitudinal rail direction, and each accommodate a strip 30, 31 made out of the same material as strips 13, 14.

In order to prepare for repair surface-layer welding, the defective area of the railhead profile is removed by grinding and/or in some other way, e.g., through ablative machining with a cutting torch, and the casting mold 21 is positioned and fixed around the exposed location of the rail profile 23.

Strips 13, 14 are intended to establish a seal on the lower side of the casting space 27, and an expansion of the strips 30, 31 is introduced in preparation for pouring steel, which can be performed in the same way as for the casting mold 6. It is important that the lower side of the casting space 27 have sealed once expansion has concluded. If necessary, a comparable sealing system can also be provided between the wall sections of the casting mold 21 and the rail profile in a vertical direction.

In a reaction crucible placed on the casting mold 21, a steel melt is produced in a known, aluminothermic manner, to which alloying elements are possibly admixed according to the material of the rails to be treated. In particular, the cast steel filled into the casting space fills out the recess of the railhead 22 produced through ablation, provided that metallurgical properties, for example with respect to hardness and strength, are produced in this region treated via surface-layer welding, in particular in a driving surface, that correspond as closely as possible to those of the remaining driving surface progression, so that no discontinuity arises in the properties owing to the surface-layer welding.

The application of the method according to the invention was introduced above with reference to a two-part casting mold 6 composed of two mold halves 4, 5. However, an application of the method is not limited to these types of casting molds, and can likewise be used in three-part casting molds, e.g., those composed of a base plate that supports the rail foot and two lateral mold parts, or even in some other multipart casting mold.

Figure 7:
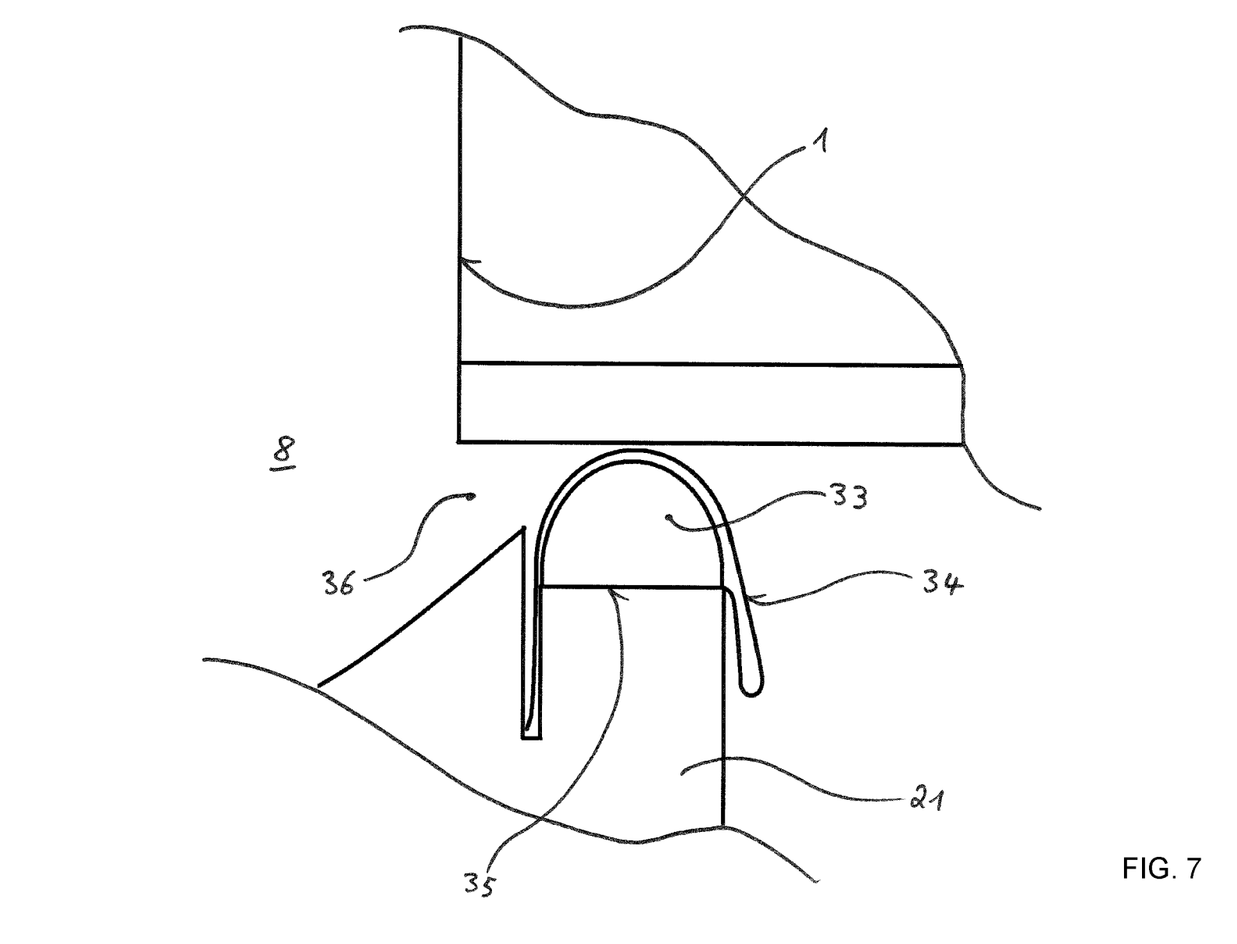
FIG. 7 is a flat, partially sectional view of a strip-like insert of exfoliated graphite as the sealant for a casting mold.

FIG. 7 shows an application for the expandable sealing compound 33, e.g., exfoliated graphite or another substance in a slit 36 to be sealed between a lower side of the rail end 1 and a surface section 35 of the casting mold 21 facing the latter.

The sealing compound 33 is integrated into a tubular enveloping body 34, which can be adhesively bonded with the surface section 35 in the initial or the delivery state. The enveloping body 34 consists of a fireproof material, e.g., a fabric, which can be elastic or inelastic.

Drawing FIG. 7 shows the sealing compound 33 in an expanded state, in which the enveloping body 34 exposed to the pressure of the sealing compound 33 firmly abuts against the mentioned lower side of the rail end 1 as well as the surface section 35, in so doing tightly sealing the slit 36. In the initial state where the sealing compound has not yet been expanded, the enveloping body is correspondingly in a relaxed state.

The above statements apply analogously with respect to a preheating and an initiation of the expansion process of the sealing compound 33.

Numerous variations of the subject matter of the application are possible; in particular, gaps are not required in all cases for receiving the sealing compound 33.

REFERENCE LIST

1. Rail end
2 Rail end
3 Welding groove
4 Welding groove
5 Mold half
6 Mold half
7 Sheath
8 Casting space
9 Wall section
10 Wall section
11 Gap 12 Gap
13 Strip
14 Strip
15 Bead
16 Bead
17 Side riser
18 Slit width
19 Slit width
20 Ignition stick
21 Casting mold
22 Railhead
23 Rail profile
24 Mold half
25 Mold half
26 Dividing plane
27 Casting space
28 Gap
29 Gap
30 Strip
31 Strip
32 Pyrotechnic substance
33 Sealing compound
34 Enveloping body
35 Surface section
36 Slit

The invention claimed is:

1. A method for performing an aluminothermic welding process on components, with two mold halves, one upwardly open, which replicate a component profile in an area of a weld, the method comprising:
    closing slits present between facing surfaces of the components and wall sections of the two mold halves with a fireproof sealing compound that can be expanded thermally or chemically in order to seal a casting space of a casting mold, the sealing compound being an expandable substance comprising an intumescent material, wherein gaps between the wall sections are smaller on interior sides facing the casting space than on exterior sides, thereby resulting in a higher flow resistance toward the interior sides as compared to the exterior sides; and
    performing the aluminothermic welding process set up as a rail connection welding or repair welding operation of a railhead by:
        preparing a steel melt in a reaction crucible; and
        introducing the steel melt into the casting space.

2. The method according to claim 1, wherein the sealing compound is received in the gaps of the mold halves.

3. The method according to claim 1, wherein the sealing compound is introduced into the gaps of the mold halves in conjunction with putting together the mold halves at a respective welding point.

4. The method according to claim 1, wherein the sealing compound is a molding body.

5. The method according to claim 1, wherein the sealing compound is a strip.

6. The method according to claim 5, wherein the strip is a self-adhesive strip.

7. The method according to claim 5, further comprising positively fixing the strip in the gaps of the mold halves at the location of a welding point.

8. The method according to claim 1, wherein the sealing compound is a pasty substance.

9. The method according to claim 8, wherein the pasty substance at its job site is applied in the form of a caterpillar.

10. The method according to claim 8, further comprising injecting the pasty substance into the gaps of the mold halves at the location of a welding point.

11. The method according to claim 1, wherein the sealing compound is a freeflowing granulate.

12. The method according to claim 1, wherein the sealing compound consists of a combination of exfoliated graphite and other mineral fireproof materials.

13. The method according to claim 1, wherein expansion of the sealing compound is initiated thermally by a pyrotechnic, an exothermally reactive substance or a similar heat source.

14. The method according to claim 1, wherein expansion of the sealing compound is initiated thermally by preheating the casting mold before pouring the steel melt.

15. The method according to claim 1, wherein the gaps and the wall sections of the casting mold are provided such that an expansion of the sealing compound preferably takes place toward the exterior sides.

16. The method according to claim 1, wherein the sealing compound is provided so as to replicate a welding bead geometry.

17. The method according to claim 2, wherein the sealing compound is a molding body.

18. The method according to claim 2, wherein the sealing compound is a strip.

19. The method according to claim 2, wherein the sealing compound is a pasty substance.

20. The method according to claim 2, wherein the sealing compound is a free-flowing granulate.

* * * * *